Nov. 24, 1964      F. T. THOMPSON      3,158,860
TARGET ACQUISITION TIME REDUCTION CIRCUIT
FOR TRACKING RADAR
Filed Dec. 29, 1960
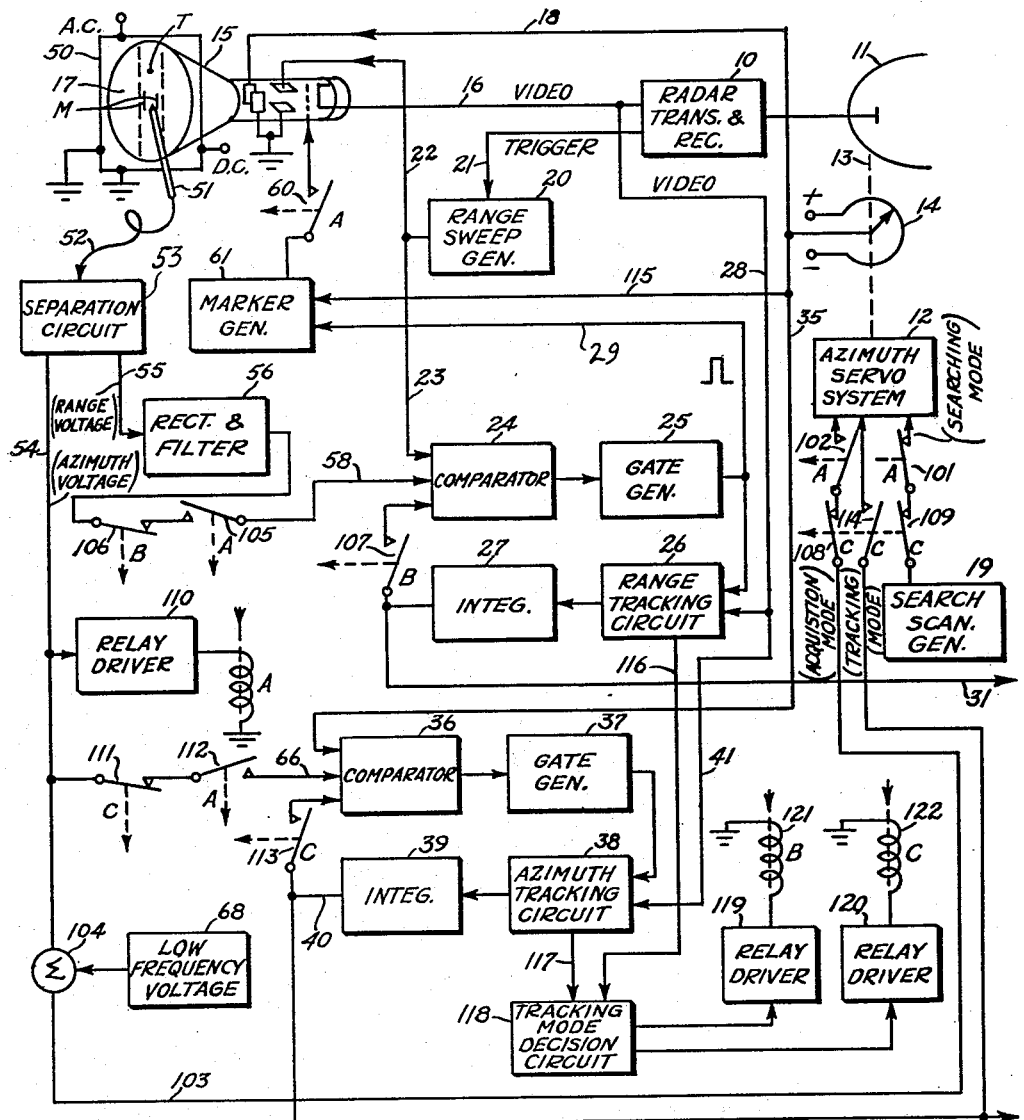
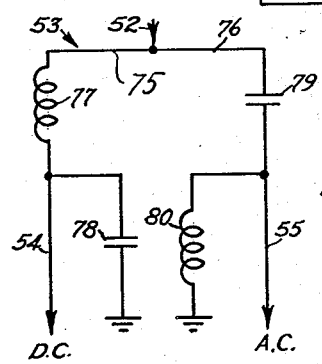
INVENTOR.
FRANCIS T. THOMPSON
BY
H. H. Loecke
ATTORNEYS

United States Patent Office 3,158,860
Patented Nov. 24, 1964

3,158,860
TARGET ACQUISITION TIME REDUCTION
CIRCUIT FOR TRACKING RADAR
Francis T. Thompson, Verona, Pa., assignor, by mesne assignments, to the United States of America as represented by the Secretary of the Navy
Filed Dec. 29, 1960, Ser. No. 79,474
5 Claims. (Cl. 343—7.3)

This invention relates to target acquisition of a target illuminated by radar and more particularly to target acquisition time reduction in accomplishing target lock-on and tracking in an automatic or aided tracking radar system.

Acquisition time reduction is becoming increasingly more important as the speed of fighter planes is increased. Acquisition time is the elapsed time between the appearance of a possible target in a radar system and the completion of "lock-on" for the range or position tracking of this target. This time may be subdivided into that time required for a pilot to decide whether to attempt to lock-on a possible target and the time required to effect this decision to complete the trial lock-on. The time required to decide to lock-on is usually several times longer than the time required after the decision to complete trial lock-on. It would appear that the only way to significantly reduce the acquisition time would be to reduce the decision time. The two subdivisions of acquisition time are closely related however. The longer the pilot watches a blip on the fluorescent screen of the radar system the more certain he becomes as to whether it is a target. If the trial lock-on is difficult and requires a relatively long period, the pilot will want to be more certain of a suspected target before he decides to attempt the trial lock-on. In order to be more certain he will consume more time making his decision.

In prior known radar devices, and particularly an example of one more pertinent to the invention herein, when an apparent target appeared on the fluorescent screen of a radar display tracking indicator, the pilot used a joy stick to position a target circle around this target and, when once accomplished, the pilot pushed a lock-on button to cause the radar system to lock-on in tracking mode to the target. A tracking indicator for this purpose was either a cathode ray tube with a double electron gun or one with a single electron gun and a time sharing circuit to accomplish indication of the target as well as the manually controlled target circle. If the pilot did not accurately track the target manually, automatic lock-on would not be accomplished and a return to manual tracking would be required.

Another known acquisition means utilized a photoelectric pencil against the cathode ray tube screen. When the beam scans under the photoelectric pencil, a pulse is obtained. The desired coordinates are obtained by relating the time at which this pulse is obtained to the scanning pattern. The disadvantages to this means are that the photoelectric pencil must be held in place until the area is scanned and the circuitry therefor requires amplifiers and time-position converters.

Still another known acquisition means consists of using a flexible arm pantograph with a mechanical pencil thereon for target pickup. Such an acquisition system has not proved to be sufficiently reliable or accurate for target acquisition.

In the present invention the target acquisition time is reduced and made simpler and easier for the purpose of reducing the decision time of the pilot to accomplish target lock-on and tracking. In the present invention a conductive transparent overlay is placed over the fluorescent screen of the cathode ray tube indicator of a target tracking radar system which overlay has a potential applied across the face in each of the azimuthal and vertical directions. This potential may be of two different types, such as direct current and alternating current, in order to establish a position on the conductive overlay in both the abscissa and ordinate directions, respectively. An electrically conductive pencil is operative to be manually positionable at any point on the conductive overlay to pick up the two potentials at the position selected producing azimuthal and vertical potential signals applicable to the azimuth and range tracking circuits of a range tracking radar system. A B-type scope is referred to by way of illustration in this invention in conjunction with a radar ranging system although it is to be understood that this invention may be equally applicable to other types of radar systems driving other types of cathode ray tube indicators without departing from the spirit and scope of this invention. In this invention the radar antenna is driven by an azimuth servo system and the azimuthal potential signal from the conducting pencil may be switched into the azimuth tracking and lock-on circuitry whenever the conducting pencil is placed on the conductive overlay to cause the antenna to oscillate over the area of contact by the electric conductive pencil. A marker generator is included in the conductive pencil pickup circuit to cause bracket markers to appear on the scope indicator, and a low frequency A.C. generator can be made to oscillate the antenna within that bracketed area. It is therefore a general object of this invention to provide a manually positionable conductive pencil and a transparent overlay for a scope fluorescent screen in a radar tracking and lock-on system to enable target selection and produce target acquisition with the speed of human ability to position the pencil for lock-on and track of a selected target illuminated by the radar.

These and other objects and attendant advantages, features, and uses may become more apparent to those skilled in the art of radar target acquisition as the description proceeds when considered along with the accompanying drawing in which:

FIGURE 1 illustrates a conventional radar target tracking and lock-on system incorporating the target acquisition time reduction device of this invention, and FIGURE 2 illustrates a circuit diagram of one of the circuit components shown in block in FIGURE 1

Referring more particularly to FIGURE 1, there is illustrated in block a radar transmitter and receiver system 10 of any conventional and known type having an antenna 11 for transmitting and receiving radar signals. The antenna 11 is driven in oscillation over an azimuth angle by an azimuth servo system 12 through shafting or other equivalent means 13. The azimuth servo system 12 is controlled by the output of a search scan generator 19 when in the search mode. The shafting 13 or other suitable means also drives an adjustable potentiometer 14 the resistance element of which is coupled across a direct current voltage source at the positive and negative terminals thereof. The radar system has a conventional cathode ray tube 15 coupled thereto. The video signals from the radar receiver 10 may be coupled by way of a conductor 16 to the cathode or grid of the cathode ray tube 15, herein shown for the purpose of illustration as being coupled to the cathode. The cathode ray tube 15 is preferably of the B-type scope in which target objects, illuminated by the antenna 11, are displayed along the azimuth at the vertical height representative of range on the fluorescent screen 17. The azimuth display is accomplished by coupling the movable tap of the potentiometer 14 via conductor 18 to one of the horizontal positioning deflection plates of the cathode ray tube 15. The other horizontal positioning electrostatic plate of the cathode ray tube 15 is coupled to ground whereby the electron beam of the cathode ray tube 15 is driven across the fluorescent screen 17 in accordance with the potential applied to the adjustable tap of the potentiometer 14, as is well understood by those skilled in the art. The vertical display on the fluorescent screen 17, in the illustration given herein, is representative of range. The range voltage is applied to one of the vertical positioning electrostatic plates of the cathode ray tube 15 while the other vertical positioning electrostatic plate is coupled to ground. The vertical driving voltage is applied from a range sweep generator 20 which is triggered from the transmitter circuit by way of a conductor means 21 from the radar which trigger may be from the magnetron, in a manner well understood by those skilled in the art. This range sweep voltage is applied by way of the conductor means 22 to the vertical positioning electrostatic plate of the cathode ray tube and is likewise applied by way of the branch circuit 23 to a comparator circuit 24 in a range tracking loop of any conventional known type of design.

The range tracking loop is herein shown as consisting of a comparator 24, a multivibrator or gate generator means 25, a range tracking circuit 26, and an integrator 27, the output of the integrator 27 being applied as a second input to the comparator 24 when properly switched, as will hereinafter be described. The output of the comparator 24 is coupled as an input to the gate generator 25 and the output of gate generator 25 is coupled to the range tracking circuit 26 as one input thereto. A second input to the range tracking circuit is the video signal from the radar coming by way of the conductor means 16 and a branch circuit 28 to the range tracking circuit 26. Any error voltages appearing in the range tracking circuit 26 will be integrated in the integrator 27 and applied, when switched, to the comparator circuit 24. The tracking loop, when once signaled for tracking mode, operates to always reduce the tracking error to zero as well understood of radar tracking circuits. The range tracking loop, however, is not able to lock-on and track a target until the position of that target is acquired by other means. The output of the gate generator 25 is applied through conductor means 29 to a marker generator 61 for the reason to be made clear later. In the range tracking mode, the output of the integrator 27 is a direct current voltage representative of the potential applied to the vertical electrostatic plate of the cathode ray tube 15 to position a target object illuminated by the radar at the range displayed. As the target object changes in range the above-mentioned range tracking loop will change accordingly as this change will be represented in the vertical co-ordinate on the fluorescent screen 17. Range tracking is accordingly accomplished by the radar system after range acquisition.

The potential picked up by the movable tap of the potentiometer 14 is conducted by way of the conductor means 18 and branch conductor means 35 as one input to a comparator 36 in an azimuthal tracking loop. This tracking loop consists of the comparator 36, a gate generator 37, an azimuthal tracking circuit 38, and an integrating network 39, in that order, the output of the integrator being conducted by way of the conductor means 40 as the second input to the comparator 36 when properly switched, as will be hereinafter described. The azimuth tracking circuit 38 has the video signal applied thereto by way of the conductor means 16 and 28 and branch circuit 41 for developing the error signal as the output of the azimuthal tracking circuit 38 to the integrator circuit 39. The integrator output is a direct current which is conducted by way of the conductor means 40 and a branch conductor 42 to the azimuth servo system 12 to position the antenna in the azimuth direction of the illustrated target. When acquisition target signals are applied to the comparator 36, the azimuth tracking loop 36 through 39 is operative to reduce the azimuthal tracking error to zero at which point the antenna is in a tracking fix on the target object. Like the range tracking loop, the azimuth tracking loop is unable to lock-on to a target position without first being signaled by target acquisition of target azimuth position. The output conductors 31 and 42 of the two tracking circuits could be utilized in the automatic pilot system or other means of automatically tracking the target by guns, missiles, or other devices. The radar system thus illustrated is of a conventional type for locking-on and tracking a target such as T shown on the fluorescent screen 17. The target T can not be tracked or lock-on accomplished until the tracking circuits are first given target acquisition voltage signals representative of target position. Once the target position voltage signals are applied to the range and azimuth tracking loop, by means of conductors 58 and 66, respectively, the radar system should track the target in both azimuth and range.

To accomplish target acquisition a transparent electrically conductive overlay 50 is placed over the cathode ray tube screen 17. An alternating current voltage is applied across the vertical dimensions of the conductive overlay 50 and a direct current voltage is applied across the overlay 50 in the horizontal or azimuthal direction. This conductive overlay 50 is constructed and arranged such that the voltage at any point in the vertical direction would be proportional to the distance between the applied alternating current voltage terminal sides. In like manner any point in the horizontal direction should produce the direct current voltage proportional to the distance between the applied direct current voltage edges of the conductive overlay 50. By this means any point selected on the conductive overlay 50 will produce alternating current and direct current potentials representative of the vertical and azimuthal position on the conductive overlay 50. In order to pick up these potentials an electrically conductive pencil 51 is manually positionable at any point on the conductive overlay 50 and the alternating current and direct current potentials will be conducted over the output conductor 52. The output conductor 52 is applied to a separation circuit 53 which separates the direct current potential into the output conductor 54 and the alternating current potential into the output conductor 55. The output voltage on 55 of the separation circuit 53 is rectified and filtered by rectifier circuit 56 to obtain a D.C. voltage representative of range applicable over conductor means 58 to the comparator 24 when in the acquisition mode. The output on the conductor 54 from the separation circuit 53 is conducted through conductor 66 as an acquisition target azimuth signal input to the comparator 36 when in the acquisition mode. The presence of a direct current voltage on conductor 54 is indicative of the fact that the conducting pencil has been placed on the conductive overlay 50. This signal is amplified by relay driver 110 and used to energize relay A which initiates the acquisition mode. Relay contacts are used throughout the description to illustrate connections in the various modes. Electronic switching means may be used in place of relays. This relay, when energized, acts by means of contacts 60 to couple the marker generator 61 to the grid circuit of the cathode ray tube 15. The purpose of the marker generator will become clear as the description proceeds and its purpose will be brought out in the description of operation. When the acquisition relay, A, is energized, switch means 101 disconnects the search scan generator 19 from the azimuth servo 12 and switch means 102 connects the azimuth voltage from the separation circuit to the azimuth servo 12 by means of conductors 54 and 103 and switching means 108. A low frequency alternating current voltage is added to the azimuth voltage by means of low frequency generator 68 and summing junction 104 for placing a low frequency oscillation on the azimuth servo system to produce an antenna oscillation of antenna 11 sweep across a narrow azimuth area under the contact position of the conductive pencil 51 as shown in the area bounded by dotted lines on screen 17. Alternately the nutation of the feed horn may provide enough azimuth sweep to permit elimination of the low frequency generator 68 and summing junction 104. Nutation of the feed horn is used in many radar systems as an aid in tracking targets both in azimuth and elevation. Although elevation tracking circuits are not illustrated it is understood that they may be used without departing from the scope of the invention. In the acquisition mode relay A is energized and the range voltage from rectifier and filter 56 is conducted through swtiching means 106 and 105 and conductor 58 as an acquisition target range signal input to the comparator circuit 24. Energizing relay A in the acquisition mode permits the azimuth voltage from the separation circuit 53 and conductor 54 to be conducted through switching means 112 and 111 and conductor means 66 as an azimuth acquisition input to comparator 36. The acquisition of a target T may be accomplished by placing the point of the conductive pencil 51 on the target T which will initiate target lock-on and tracking in the radar tracking and lock-on loops.

A tracking mode decision circuit 118 has coupled to it an output 116 from the range tracking circuit 26 and an output 117 from the azimuth tracking circuit 38. When the target pulse applying the video signal by way of conductors 16 and 28 to the range tracking circuit 26 is within the range gate produced by the gate generator 25, a signal will be conducted over the output 116 to activate the tracking mode decision circuit which will produce a voltage signal in a driver relay 119 to energize a relay coil 121 of a range tracking relay switch B. In like manner when the video signal coming by way of conductors 16, 28, 41 to the azimuth tracking circuit 38 is within the range gate produced by the azimuth gate generator 37, a signal will be produced over the output 117 to cause the relay driver 120 to energize the relay coil 122 of an azimuth tracking relay switch C. The relay switches A, B, and C are all shown in their normal positions when the respective relay coils are not energized. Upon energization of the relays A, B, or C, the switches will be pulled in the direction of the arrows on the broken lines connected to actuate these switches.

Referring more particularly to FIGURE 2, the separation circuit 53 of FIGURE 1 is illustrated in one example herein as consisting of branch circuits 75 and 76 coupled to the conductive pencil output 52. The branch conductor 75 has a coil or inductance means 77 of substantially high impedance to block alternating current and a capacitor 78 for bypassing alternating current to ground. The output conductor 54 is coupled to the juncture of the capacitor 78 and inductance 77 to conduct the direct current coming by way of the conductor means 52. In the branch circuit 76 a blocking capacitor 79 is in series with the output conductor 55 to conduct alternating current therefrom. An inductance 80 is coupled between the output conductor 55 and ground to bypass any D.-C. current to ground. FIGURE 2 illustrates merely one form of a separation circuit 53 although other well-known circuits may be used to accomplish the separation of alternating current and direct current voltages.

Operation

In the operation of the device shown in FIGURE 1, let it be assumed that a radar ranging transmitter and receiver system is used as above described with a display tube of the B-scope type for displaying target objects illuminated by radar pulses beamed from the antenna 11. The antenna is driven to oscillate over an azimuthal area by the search scan generator 19 through the azimuth servo system 12 and the beam of the cathode ray tube 15 is deflected horizontally across the fluorescent screen 17 in accordance with the voltage applied to the horizontal deflection plate from the potentiometer 14. Whenever a target appears, such as T, which is illuminated by the antenna 11, the reflected echo pulse is operative to produce a video signal over the conductor means 16 to the cathode of the cathode ray tube 15 to produce the bright spot represented by T on the fluorescent screen 17. The vertical position of the target object T from the base of the cathode ray tube 15 is determined by the time that it takes the radar pulse from the antenna 11 to travel to the target object and back to the antenna 11. This range is represented electrically by a linear sawtooth sweep voltage generated by the range sweep generator 20 which is initiated in its sweep by the trigger from the magnetron channel coming by way of conductor means 21. Without any target acquisition signals being applied to the range of azimuth tracking and lock-on circuits by way of the conductor means 58 and 66, respectively, the radar will continue in scanning mode and display any targets in the scanned area. Upon placement of the conductive pencil 51 in contact with the conductive overlay 50 over the target T on the fluorescent screen 17 alternating current voltage and direct current voltage signals will be produced on the output 52 for application to the separation circuit 53. The voltage output of the separation circuit 53 is amplified by relay driver 110 and energizes relay coil A causing switching means 60, 102, 105, and 112 to become conducting and causing switching means 101 to become nonconducting. This places the system in the acquisition mode during which relays B and C are not energized so that switching means 106, 108, 109, and 111, are conducting and switching means 107, 113, and 114 are nonconducting. The separated alternating current voltage over output conductor 55 is rectified by circuit 56 and sent as a direct current voltage over the switching means 106 and 105 and the conductor means 58 to the comparator circuit 24. The output pulse from gate generator 25 in the acquisition mode is a time domain signal representative of the range at which the conductive pencil 51 is placed. This signal is applied to the marker generator 61 by conductor means 29. The output from potentiometer 14 which is a voltage representative of the azimuth excursions of the antenna is applied by means of conductor 115 as a second input to the marker generator. Since in the acquisition mode the antenna oscillates about the azimuth determined by the conductive pencil 51 the voltage applied to marker generator 61 by conductor 115 is representative of the azimuth at which the pencil is placed. A voltage from the marker generator is applied to the grid of the cathode ray tube 15 by switching means 60. This voltage brightens the beam of the cathode ray tube 15 so as to produce a marker symbol representative of the conductive pencil position on the screen of the cathode ray tube 17. This marker signal is exemplified on the screen of the cathode ray tube 17 by the reference character M. The marker signal is shown as brackets M for bracketing a target object. Should misregistry of the conductive pencil position and the marker M position occur due to such things as nonlinearities in the conductive coating of overlay 50, the pencil may be easily shifted while contacting the conductive coating until the marker brackets M surround the desired target. Misregistry problems are thereby eliminated if a single beam of a cathode ray tube is time shared to provide both target marks and the marker M. Alternatively, a separate beam may be used for generating the marker if it is registered with the target producing beam. At the same time the direct current signal coming by way of the conductor means 54 and 66 and switching means 111 and 112 to the comparator 36 is compared with the voltage applied from the potentiometer 14 coming by way of the conductor means 35. The output of the comparator circuit will produce a voltage signal which initiates gate generator operation to produce a pulse that is applied to the tracking circuit 38. At the same time the acquisition range voltage from circuit 56 is applied by switching means 106 and 105 and conductor 58 to the range comparator 24. The comparator output is applied to gate generator 25 which provides a gating pulse which is applied to range tracking circuit 26. When the target pulse is within the range gate, an output is applied to the tracking mode decision circuit 118 by means of conductor 116. Relay driver 119 is energized by circuit 118 causing relay B coil 121 to be energized. This causes switching means 106 to become nonconducting and causes switching means 107 to conduct thereby applying the output of the integrator 27 to comparator 24. The voltage output from range tracking circuit 26 to integrator 27 is an error voltage which is integrated by integrator 27 and applied back to comparator circuit 24 so as to maintain the target pulse centered in the gate pulse.

When the target pulses are within the azimuth gate from gate generator 37, an output is applied from azimuth tracking circuit 38 through conductor 117 to the tracking mode decision circuit 118 which energizes relay driver 120 causing relay C coil 122 to be energized. This causes switching means 108, 109, and 111 to become nonconducting and switching means 113 and 114 to become conducting. The azimuth error voltage from azimuth tracking circuit 38 is integrated by integrator 39 which produces a voltage representative of the azimuth of the target. This voltage is applied to the comparator 36 by switching means 113 and conductor 40 so as to maintain the target pulses centered in the azimuth gate. The output of the integrator means 39 over the conductor means 42 is applied by switching means 114 to the azimuth servo system 12 to bring the antenna 11 to rest in the azimuthal direction of the target. Once target acquisition has been completed and the tracking mode is entered it is no longer necessary to hold the conductive pencil 51 over the target. Should the target prove false and lock-on not occur, the conductive pickup pencil may be removed and the scanning mode will be resumed automatically. This means of target acquisition being easy and simple reduced the acquisition time since the decision making time is reduced and the operation of a separate lock-on circuit is eliminated. Also, if there are several targets, an immediate selection can be obtained by merely placing the conductive pickup pencil 51 on the conductive overlay 50 over the target selected and this maneuver alone initiates target lock-on and tracking thereafter.

While many modifications and changes may be made in the constructional details and circuits to accommodate different types of radar tracking systems, it is understood that I desire to be limited in the constructional and functional details of my target acquisition time reduction device only in the scope and spirit of the appended claims.

I claim:
1. A target acquisition time reduction means for range tracking radar comprising: a radar range tracking system having tracking circuits therein for automatic target lock-on and tracking and having a cathode ray tube for target display in which said tracking circuits are for horizontal and vertical driving circuits of said cathode ray tube; an electrically conductive surface over the fluorescent screen of said cathode ray tube, said conductive surface having an alternating current and a direct current applied to opposite portions thereof to produce two electric fields, one of alternating current and one of direct current in right angle relation; and an electrically conductive pickup pencil adapted to be placed in contact with said conductive surface to conduct said electric potentials, said pickup pencil being coupled through a separation network for separating the direct current potential and the alternating current potential for application, respectively, to the horizontal and vertical tracking circuits in a manner to cause said tracking circuits to lock-on to the position of contact of said pickup pencil on said conductive surface whereby target tracking may be acquired by contacting said pencil over the target.

2. A target acquisition time reduction means for azimuth and range tracking radar having azimuth and range tracking and lock-on circuits and having a cathode ray tube with a fluorescent screen to display targets illuminated by the radar, the invention which comprises: a transparent conductive overlay over said fluorescent screen having a direct current potential applied thereacross in the azimuthal direction and having an alternating current potential applied thereacross in the vertical direction indicative of range potential; and an electrically conductive pickup pencil coupled through a means for separating said direct current and alternating current potentials and a means for rectifying said alternating current for the publication of the direct current potentials respectively to said azimuth and range tracking and lock-on circuits, said pickup pencil being adapted for selective positional contact on said conductive overlay to pick up said direct and alternating current potentials and apply same respectively to said azimuth and range tracking and lock-on circuits whereby said fluorescent screen will display thereon the selected position of said pickup pencil on said conductive overlay, and whereby the selected position superimposed over a target display will produce target lock-on and tracking.

3. A target acquisition time reduction means as set forth in claim 2 wherein the combination coupling of said pickup pencil, tracking and lock-on circuits, and said cathode ray tube includes a marker generator for producing bracket marks on said fluorescent screen at said selected position of said pickup pencil on said conductive overlay.

4. A target acquisition time reduction means as set forth in claim 3 wherein said coupling of said direct current potential to said azimuth tracking and lock-on circuits includes means for activating the application of a low frequency voltage to the output of said azimuth tracking and lock-on circuit to produce radar antenna oscillation over the selected point of contact of said pickup pencil on said conductive overlay.

5. A target acquisition time reduction means as set forth in claim 2 wherein contact of said pickup pencil onto said conductive overlay activates acquisition relay switches in said couplings of said pickup pencil to said azimuth and range tracking circuits to place same in the acquisition mode, and said azimuth and range tracking and lock-on circuits are coupled to activate tracking and lock-on relay switches in said tracking and lock-on circuits when range and azimuth tracking is accomplished to place said azimuth and range tracking and lock-on circuits in the tracking and lock-on modes.

References Cited by the Examiner
UNITED STATES PATENTS

| | | | |
|---|---|---|---|
| 2,704,305 | 3/55 | McLaughlin et al. | 343—5 |
| 2,891,244 | 6/59 | Pastoriza | 343—7.3 |
| 2,917,737 | 12/59 | Close et al. | 343—7.3 |
| 3,032,609 | 5/62 | Flurhr et al. | 178—18 |

KATHLEEN H. CLAFFY, *Primary Examiner.*

MALCOLM A. MORRISON, CHESTER L. JUSTUS,
*Examiners.*

UNITED STATES PATENT OFFICE
CERTIFICATE OF CORRECTION

Patent No. 3,158,860                                                   November 24, 1964

Francis T. Thompson

It is hereby certified that error appears in the above numbered patent requiring correction and that the said Letters Patent should read as corrected below.

Column 6, line 14, for "of", first occurrence, read -- or --; column 8, line 19, for "publication" read -- application --.

Signed and sealed this 20th day of April 1965.

(SEAL)
Attest:

ERNEST W. SWIDER
Attesting Officer

EDWARD J. BRENNER
Commissioner of Patents